US008796351B2

(12) United States Patent
Koch

(10) Patent No.: US 8,796,351 B2
(45) Date of Patent: Aug. 5, 2014

(54) PRESSURE SENSITIVE ADHESIVES MADE FROM RENEWABLE RESOURCES AND RELATED METHODS

(75) Inventor: Carol A. Koch, San Gabriel, CA (US)

(73) Assignee: Avery Dennison Corporation, Glendale, CA (US)

( * ) Notice: Subject to any disclaimer, the term of this patent is extended or adjusted under 35 U.S.C. 154(b) by 965 days.

(21) Appl. No.: 12/599,693

(22) PCT Filed: May 20, 2008

(86) PCT No.: PCT/US2008/064278
§ 371 (c)(1),
(2), (4) Date: Jun. 30, 2010

(87) PCT Pub. No.: WO2008/144703
PCT Pub. Date: Nov. 27, 2008

(65) Prior Publication Data
US 2010/0261806 A1 Oct. 14, 2010

Related U.S. Application Data

(60) Provisional application No. 60/939,328, filed on May 21, 2007.

(51) Int. Cl.
C09J 133/10 (2006.01)

(52) U.S. Cl.
USPC ........... 522/183; 522/170; 522/178; 522/182; 526/321; 526/325

(58) Field of Classification Search
USPC .......... 522/129, 121, 170, 182; 528/405, 418, 528/419
See application file for complete search history.

(56) References Cited

U.S. PATENT DOCUMENTS

| | | | |
|---|---|---|---|
| 3,444,116 A * | 5/1969 | Gagnon et al. | 523/412 |
| 4,151,055 A * | 4/1979 | Stueben et al. | 522/121 |
| 4,659,771 A * | 4/1987 | Craig | 524/700 |
| 4,994,537 A * | 2/1991 | Craig et al. | 526/273 |
| 5,514,728 A * | 5/1996 | Lamanna et al. | 522/31 |
| 5,670,562 A * | 9/1997 | Schilling | 524/61 |
| 6,319,603 B1 * | 11/2001 | Komiya et al. | 428/378 |
| 6,613,857 B1 * | 9/2003 | Koch et al. | 526/329.6 |
| 6,646,033 B2 * | 11/2003 | Wool et al. | 524/157 |
| 7,524,909 B2 * | 4/2009 | Palmese et al. | 526/318 |
| 7,682,477 B2 * | 3/2010 | Moeller et al. | 156/275.5 |
| 7,981,988 B2 * | 7/2011 | Hyde | 526/317.1 |
| 2002/0188056 A1 | 12/2002 | Wool | |
| 2009/0104448 A1 * | 4/2009 | Thompson et al. | 428/413 |
| 2012/0156484 A1 * | 6/2012 | Vendamme et al. | 428/355 R |

FOREIGN PATENT DOCUMENTS

| | | |
|---|---|---|
| EP | 1640388 | 3/2006 |
| GB | 1279939 | 6/1972 |
| GB | 1373316 | 11/1974 |
| WO | 91/04151 | 4/1991 |
| WO | 2007/140102 | 12/2007 |

OTHER PUBLICATIONS

Studies on Acrylated Epoxidized Triglyceride Resin-co-Butyl Methacrylate Towards the Development of Biodegradable Pressure Sensitive Adhesives authored by David et al. and published in Journal of Materials Science: Materials in Medicine (2009), 20 (Suppl. 1) S61-S70.*
International search Report and Written Opinion dated Nov. 21, 2008 from corresponding International Application No. PCT/US2008/064278.
Amendment under Articel 34 dated Mar. 18, 2009 from corresponding International Application No. PCT/US2008/064278.
Second Written Opinion dated Sep. 10, 2009 from corresponding International Application No. PCT/US2008/064278.
Response dated Oct. 9, 2009 to Second Written Opinion from corresponding International Application No. PCT/US2008/064278.
International Preliminary Report on Patentability dated Oct. 29, 2009 from corresponding International Application No. PCT/US2008/064278.

\* cited by examiner

*Primary Examiner* — Marc Zimmer
(74) *Attorney, Agent, or Firm* — Avery Dennison Corporation

(57) ABSTRACT

A method for forming a pressure sensitive adhesive including providing a substance that is an epoxidized triglyceride or an epoxidized fatty ester, and polymerizing the substance. A pressure sensitive adhesive can be formed by copolymerizing at least two substances that can be an epoxidized triglyceride, epoxidized fatty ester, or (meth)acrylic copolymer. In yet another method, the at least two substances can be an acrylated epoxidized triglyceride, acrylic copolymer, fatty acid based monomer produced by the reaction of an acid group of a fatty acid and an epoxy group of glycidylmethacrylate, or (meth)acrylic monomer.

12 Claims, 1 Drawing Sheet

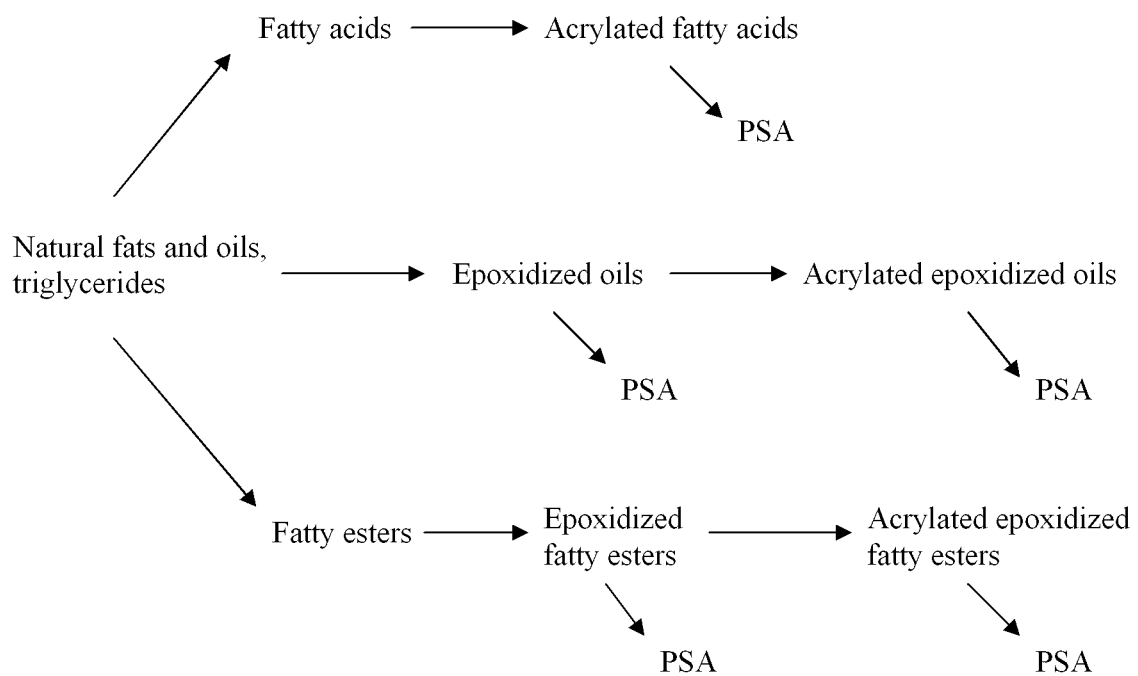

PRESSURE SENSITIVE ADHESIVES MADE FROM RENEWABLE RESOURCES AND RELATED METHODS

CROSS-REFERENCE TO RELATED APPLICATIONS

This application is the National Stage of International Patent Application No. PCT/US2008/64278, filed on May 20, 2008, entitled "Pressure Sensitive Adhesives Made From Renewable Resources And Related Methods," by Avery Dennison Corporation, which claims priority to U.S. Provisional Patent Application No. 60/939,328, filed on May 21, 2007, entitled "Pressure Sensitive Adhesives From Renewable Resources," by Carol A. Koch. Both International Patent Application No. PCT/US2008/64278 and U.S. Provisional Patent Application No. 60/939,328, are incorporated by reference in their entireties herein.

FIELD OF THE INVENTION

The invention relates generally to the field of pressure sensitive adhesives (PSAs). More specifically, the invention relates to PSAs that are formed from renewable resources, e.g., bio-based materials, and methods for forming the pressure sensitive adhesives.

BACKGROUND

At present, PSAs are predominately made from monomers based on petroleum products. With the increasing cost and limited supply of oil, the use of renewable resources as raw material components for PSAs has become economically attractive and socially responsible. The limited production capacity of the acrylic monomers used in acrylic PSAs is another driving force for investigating alternate sources. Furthermore, a performance advantage of bio-based PSAs could include biodegradability, which supports the environmental friendliness of these adhesives. The present invention satisfies these needs.

SUMMARY

An exemplary method according to the invention is a method for forming a pressure sensitive adhesive. The method includes providing a substance that is an epoxidized triglyceride or an epoxidized fatty ester, and polymerizing the substance.

In other, more detailed features of the invention, the substance is derived from an oil. The oil can be soybean oil, palm oil, olive oil, corn oil, canola oil, linseed oil, rapeseed oil, castor oil, coconut oil, cottonseed oil, palm kernel oil, rice bran oil, safflower oil, sesame oil, sunflower oil, tall oil, lard, tallow, fish oil, or a mixture thereof.

In other, more detailed features of the invention, the step of polymerizing the substance is accomplished using ultraviolet radiation. Also, the step of polymerizing the substance can be accomplished using solvent-based polymerization. In addition, the step of polymerizing the substance can include photocatalyzed cationic polymerization.

Another exemplary method according to the invention is a method for forming a pressure sensitive adhesive. The method includes providing a conjugated linoleic acid, and copolymerizing the conjugated linoleic acid with an acrylic monomer.

Another exemplary method according to the invention is a method for forming a pressure sensitive adhesive. The method includes providing at least two substances that can be an epoxidized triglyceride, an epoxidized fatty ester, or a (meth)acrylic copolymer, and copolymerizing the at least two substances.

Another exemplary method according to the invention is a method for forming a pressure sensitive adhesive. The method includes providing at least two substances that can be an acrylated epoxidized triglyceride, an acrylic copolymer, a fatty acid based monomer produced by the reaction of an acid group of a fatty acid and an epoxy group of glycidylmethacrylate, or a (meth)acrylic monomer, and copolymerizing the at least two substances.

In other, more detailed features of the invention, the at least two substances are derived from at least one oil. Also, the at least one oil can be soybean oil, palm oil, olive oil, corn oil, canola oil, linseed oil, rapeseed oil, castor oil, coconut oil, cottonseed oil, palm kernel oil, rice bran oil, safflower oil, sesame oil, sunflower oil, tall oil, lard, tallow, fish oil, or a mixture thereof.

In other, more detailed features of the invention, the step of copolymerizing the at least two substances is accomplished using ultraviolet radiation. Also, the step of copolymerizing the at least two substances can be accomplished using solvent-based polymerization. In addition, the step of copolymerizing the at least two substances can include photocatalyzed cationic polymerization.

In other, more detailed features of the invention, the pressure sensitive adhesive is a removable pressure sensitive adhesive or a permanent pressure sensitive adhesive. Also, the pressure sensitive adhesive can be configured to be used on paper, film, a label, and tape.

An exemplary embodiment is a pressure sensitive adhesive formed using any of the previously described methods.

Other features of the invention should become apparent to those skilled in the art from the following description of the preferred embodiments taken in conjunction with the accompanying drawing, which illustrates, by way of example, the principles of the invention, the invention not being limited to any particular preferred embodiment(s) disclosed.

BRIEF DESCRIPTION OF THE DRAWING

These and other features, aspects, and advantages of the present invention will become better understood with reference to the following description, appended claims, and accompanying drawing, where:

FIG. 1 is a flow diagram of example methods for creating PSA according to the invention.

DETAILED DESCRIPTION OF THE PREFERRED EMBODIMENTS

Acrylated epoxidized vegetable oils can be copolymerized with acrylic monomers or with low molecular weight acrylic copolymers using on web Ultraviolet (UV) radiation to generate coatings with the glass transition temperature ($T_g$) and modulus properties that are appropriate for PSAs. Acrylated epoxidized soybean oil (AESO) is commercially available and can be used to make PSA, as shown in FIG. 1, which is a flow diagram of the progression of modifications to natural fats and oils, or triglycerides, and their reactions into components/substances that result in PSAs. But the AESO can have functionality, i.e., the number of acrylic groups per molecule as high as 5 or more. The high number of acrylic groups can result in a fairly highly crosslinked polymer network, which increases the modulus and decreases the utility as a PSA. Incorporating a low level (less than 20%) of AESO makes an effective and useful PSA.

In some embodiments, vegetable oils other than AESO and having lower levels of functionality can be used for making PSAs, e.g., palm oil consists of 50% unsaturated fatty acid and olive oil consists of over 70% mono-unsaturated fatty acids, whereas soybean oil consists of 15% unsaturated and 23% mono-unsaturated fatty acids.

In other embodiments, the fatty acids or esters can be acrylated giving monofunctional materials that can be copolymerized with acrylics to make PSAs. For example, oleic acid is a major component in many vegetable and seed oils including soybean, olive, corn, palm, canola, etc. Erucic acid is a longer chain mono-unsaturated fatty acid derived from rapeseed oil.

The oils or fatty acids and esters can be functionalized by epoxidation of the double bonds. These epoxidized materials can be used to react with comonomers containing epoxy groups or with vinyl ethers by photocatalyzed cationic polymerization.

TABLE 1

Common Names for Fatty Acids Found in Oils and Fats

| Fatty Acid | Number of Carbons | Number of C-C Double Bonds |
|---|---|---|
| myristic | 14 | 0 |
| myristoleic | 14 | 1 |
| palmitic | 16 | 0 |
| palmitoleic | 16 | 1 |
| margaric | 17 | 0 |
| margaroleic | 17 | 1 |
| stearic | 18 | 0 |
| oleic | 18 | 1 |
| linoleic | 18 | 2 |
| linolenic | 18 | 3 |
| arachidic | 20 | 0 |
| gadoleic | 20 | 1 |
| eicosadienoic | 20 | 2 |
| behenic | 22 | 0 |
| erucic | 22 | 1 |
| lignoceric | 24 | 0 |

TABLE 2

Typical Fatty Acid Composition (wt %) of Common Oils and Fats

| Oil/Fat | 16:0 | 16:1 | 18:0 | 18:1 | 18:2 | 18:3 | 20:1 | 22:1 | 24:0 | Average Unsaturation Per Triglyceride |
|---|---|---|---|---|---|---|---|---|---|---|
| soybean | 11 | 0.1 | 4 | 23.4 | 53.2 | 7.8 | | | | 4.6 |
| palm | 44.4 | 0.2 | 4.1 | 39.3 | 10 | 0.4 | | | | 1.8 |
| rapeseed | 3 | 0.2 | 1 | 13.2 | 13.2 | 9 | 9 | 49.2 | 1.2 | 3.8 |
| sunflower | 6 | | 5 | 20 | 60 | | | | | 1.4 |
| tallow | 27 | 11 | 7 | 48 | 2 | | | | | 0.6 |
| cottonseed | 21.6 | 0.6 | 2.6 | 18.6 | 54.5 | 0.7 | | | | 3.9 |
| olive | 13.7 | 1.2 | 2.5 | 71.1 | 10 | 0.6 | | | | 2.8 |
| corn | 10.9 | 0.2 | 2 | 25.4 | 59.6 | 1.2 | | | | 4.5 |
| canola | 4.1 | 0.3 | 1.8 | 60.9 | 21 | 8.8 | 1 | 0.7 | 0.2 | 3.9 |
| linseed | 5.5 | | 3.5 | 19.1 | 15.3 | 56.6 | | | | 6.6 |

The epoxidized oils or fatty acids and esters can be further functionalized using vinyl carboxylic acids such as acrylic acid or methacrylic acid to introduce acrylic functional groups. The acrylic or methacrylic group will react with additional acrylic comonomers by traditional free radical polymerization methods.

The PSAs described in this invention could be used as removable or permanent adhesives on paper or film facestocks in a variety of applications ranging from general purpose labels, office product labels, industrial tapes, and even medical applications.

Renewable resources such as natural fats and oils from plant or animal sources (e.g., soybean oil, palm oil, olive oil, corn oil, canola oil, linseed oil, rapeseed oil, castor oil, coconut oil, cottonseed oil, palm kernel oil, rice bran oil, safflower oil, sesame oil, sunflower oil, tall oil, lard, tallow, fish oil, and mixtures thereof) consist of triglycerides that are composed of three fatty acids connected to a glycerol molecule. Typically, the fatty acids are long chain (C14 to C24) materials with multiple double bonds per chain. Oils contain a distribution of the fatty acids depending on the source. See Tables 1 and 2, and "The Chemistry of Oils and Fats" by Frank D. Gunstone (Blackwell Publishing 2004), which is incorporated by reference herein in its entirety.

The unsaturation serves as a potential reaction site for polymerization. The double bonds are relatively unreactive unless conjugated as in drying oils such as Tung oil. But in one or more embodiments, the double bonds are modified and polymerization occurs based on the modification.

Epoxidized Triglycerides and Fatty Esters

Epoxidized vegetable oils, such as soybean oil and linseed oil, are readily available from suppliers such as Cognis of Cincinnati, Ohio, Arkema Inc. (Arkema) of King of Prussia, Pa., and Cytec Industries (Cytec) of West Paterson, N.J. These materials are commonly used as plasticizers and stabilizers for polyvinylchloride polymers. Epoxidized fatty acids and esters are also available. In some embodiments, the epoxy group would be used in cationic UV polymerization along with epoxy containing oligomers or low molecular weight polymers. The $T_g$ and the crosslink density would be relatively low for the resulting polymer, and the polymer performs as a pressure sensitive adhesive.

Mono-functional fatty acids and esters can be used to make PSAs. For example, oleic (18:1) or erucic acid (22:1), i.e., the first number in the parenthesis indicates the number of carbons and the second number in the parenthesis indicates the number of double bonds, for example, (22:1) would indicate 22 carbon atoms long containing 1 C=C double bond. In the embodiments, the following process can be used: Epoxidize—The double bonds can be epoxidized by reaction with peracids. These materials can undergo UV cationic cure to form homopolymers or copolymers with epoxy or vinylethers monomers.

Acrylated Epoxidized Triglycerides and Fatty Esters

Acrylated epoxidized soybean oils are available from Sigma-Aldrich (Aldrich) of Wilmington, Del., Cognis (PHOTOMER 3005) and Cytec (EBECRYL 860). These are copolymerized with acrylic monomers or low molecular weight acrylic copolymers using on-web UV radiation to generate coatings with low $T_g$ and modulus properties that are required for pressure sensitive adhesives.

In other embodiments, fatty esters could be acrylated giving monofunctional materials that could be copolymerized with acrylics to make PSAs. For example oleic acid is a major component in many vegetable and seed oils including soybean, olive, corn, palm, canola, etc. Erucic acid is a longer chain mono-unsaturated fatty acid derived from rapeseed oil. The esters of these fatty acids, including methyl, butyl, and 2-ethylhexyl, would provide the $T_g$ and modulus properties needed for PSA formulations.

Palm Oil-Based PSA

| Composition: | palmitic (16:0) | 44.4% |
|---|---|---|
| | stearic (18:0) | 4% |
| | oleic (18:1) | 39.3% |
| | linoleic (18:2) | 10% |
| | linolenic (18:3) | 0.4% |

Average 1.82 double bonds per triglyceride, and hence able to incorporate higher levels while keeping a low modulus. The double bonds in palm oil can be epoxidized using peracids formed in situ, for example, by the reaction of hydrogen peroxide and formic acid. The epoxidized palm oil can be further modified by reaction with acrylic acid to form the acrylated epoxidized palm oil.

In one embodiment, a PSA can be made using epoxidized palm oil and cationic UV cure with epoxy acrylics or vinyl ethers. In another embodiment, PSA can be made using acrylated epoxidized palm oil and UV polymerization on web with acrylic monomers.

Solvent-Based Polymerization

In still other embodiments, solvent-based polymerization could be used when the acrylated material predominately contains molecules that are monofunctional. If multifunctional components are used in solvent-based polymerization at high concentrations, then gelation could occur, resulting in insoluble materials that are not easily coatable and not suitable for PSAs.

EXAMPLES

Example I

| AESO | 8.758 g | (acrylated soybean oil, Aldrich) |
|---|---|---|
| S-01-01 | 69.322 g | (UV-curable acrylic polymer at 50% solids, See Ex. 2 of U.S. Pat. No. 6,613,857 to Koch et al., which is incorporated by reference in its entirety herein) |
| Benzophenone | 0.004 g | (UV photoinitiator) |
| Methyldiethylamine | 0.006 g | (amine photosynergist) |

The formulation was blade coated on siliconized release paper at a wet thickness of 200 µm, dried in an oven at 70° C. for 5 min, and then UV-cured using an American Ultraviolet Company (of Lebanon, Ind.) conveyorized ultraviolet curing system with a single medium pressure mercury bulb set to 300 W/in. The linespeed was 50 ft/min and the dosage (0.273 J/cm$^2$) was measured using a UVICUREPLUS radiometer manufactured by EIT, Inc. (of Sterling, Va.). This resulted in a tacky film suitable for PSA applications. The cohesive strength as measured by a room temperature shear test with a ½×½ inch samples size and a 500 gram weight, resulted in a failure time of 800 minutes. The adhesive strength as measured by a 180° peel test to panels after a 24 hour dwell resulted in a force of 2.8 lbs/inch from stainless steel and 0.33 lb/inch from high-density polyethylene (HDPE). The rheological properties were tested using Dynamic Mechanical Analysis. A temperature sweep at 10 rad/s showed a $T_g$ of −9° C. with a G' (storage modulus) at 25° C. of $3 \times 10^6$ dyne/cm$^2$. The master curve showed G' at 0.01/s of $1.86 \times 10^5$ dyne/cm$^2$ and G' at 100/s of $3.6 \times 10^6$ dyne/cm$^2$.

Fatty Acids-Based Monomer

Another route to acrylic monomers derived from natural oil has been developed by Palmese et. al. in US 2005/0250923, which is incorporated by reference in its entirety herein. This work shows the reaction between the acid group of a fatty acid with glycidyl methacrylate (GMA) to form methacrylate monomers, e.g., Lauric acid (12:0) is reacted with glycidyl-methacrylate to form the methacrylated fatty acid monomer.

Although these monomers were developed in order to serve as styrene replacements in thermoset composites, they can be homopolymerized or copolymerized with acrylic monomers to form PSAs. Since they are formed by the reaction of the acid group of the fatty acid, they do not depend on the unsaturation or the number of double bonds present in the fatty acid. This expands the type of starting materials that can be used.

Conjugated Linoleic Acids

Conjugated linoleic acid (CLA) is present in drying oils such as Tung oil, which includes 82% eleostearic acid (9-cis-11-trans-13-cis-octadecatrienoic acid). Conjugation makes Tung oil more susceptible to free radical reactions. In one embodiment, the method of making PSA includes hydrolyzing Tung oil to fatty acids with conjugated double bonds, and subsequent free radical polymerization with acrylic monomers.

Example II

| Composition: | VIKOFLEX 4050 | 10.248 g |
|---|---|---|
| | EDENOL 9232 | 1.406 g |
| | UVC9390C | 0.124 g |

VIKOFLEX 4050 is an epoxidized vegetable oil manufactured by Arkema, EDENOL 9232 is an epoxidized soy oil manufactured by Cognis, and UVC9390C is a photocatalyst solution manufactured by Momentive, GE Advanced Materials of Waterford, N.Y. The formulation was blade coated on 2 mil polyethylene terephthalate (PET) at a wet thickness of 50 µm, dried in an oven at 70° C. for 5 minutes, and then UV-cured 6 passes at 300 W/in using a linespeed of 50 ft/min. This resulted in a tacky film that is suitable for PSA applications.

Example III

| Composition: | VIKOFLEX 4050 | 3.209 g |
| --- | --- | --- |
| | EDENOL 9232 | 0.193 g |
| | Acrylic copolymer* | 8.089 g |
| | UVC9390C | 0.065 g |

*2-ethylhexylacrylate (2-EHA), butylacrylate (BA), acrylic acid (AA), glycidyl methacrylate (GMA)/45:45:5:5 polymerized in ethylacetate at 40% solids.

The formulation was blade coated on 2 mil PET at a wet thickness of 50 μm, dried in an oven at 70° C. for 5 minutes, and then UV-cured 6 passes at 300 W/in using a linespeed of 50 ft/min. This resulted in a very tacky film that is suitable for PSA applications.

All features disclosed in the specification, including the claims, abstract, and drawing, and all of the steps in any method or process disclosed, may be combined in any combination, except combinations where at least some of such features and/or steps are mutually exclusive. Each feature disclosed in the specification, including the claims, abstract, and drawing, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A method for forming a pressure sensitive adhesive, the method comprising:
   (a) providing at least two substances selected from the group consisting of epoxidized fatty esters and (meth) acrylic copolymers; and
   (b) copolymerizing the at least two substances using organic solvent-based polymerization or on web polymerization.

2. The method according to claim 1, wherein each of the at least two substances are derived from one or more oils.

3. The method according to claim 2, wherein the one or more oils is selected from the group consisting of a soybean oil, a palm oil, an olive oil, a corn oil, a canola oil, a linseed oil, a rapeseed oil, a castor oil, a coconut oil, a cottonseed oil, a palm kernel oil, a rice bran oil, a safflower oil, a sesame oil, a sunflower oil, a tall oil, a lard, a tallow, a fish oil, and a mixture thereof.

4. The method according to claim 1, wherein the step of copolymerizing the at least two substances is accomplished using ultraviolet radiation.

5. The method according to claim 1, wherein the step of copolymerizing the at least two substances includes photocatalyzed cationic polymerization.

6. The method according to claim 1, wherein the pressure sensitive adhesive is selected from the group consisting of a removable pressure sensitive adhesive and a permanent pressure sensitive adhesive.

7. A method for forming a pressure sensitive adhesive, the method comprising:
   (a) providing at least two substances selected from the group consisting of an acrylated epoxidized triglyceride, an acrylic copolymer, a fatty acid based monomer produced by the reaction of an acid group of a fatty acid and an epoxy group of glycidylmethacrylate, and a (meth) acrylic monomer; and
   (b) copolymerizing the at least two substances using organic solvent-based polymerization or on web polymerization;
   wherein the step of copolymerizing the at least two substances includes photocatalyzed cationic polymerization.

8. The method according to claim 7, wherein the acrylated epoxidized triglyceride and fatty acid based monomer produced by the reaction of an acid group of a fatty acid and an epoxy group of glycidylmethacrylate are derived from at least one or more oils.

9. The method according to claim 8, wherein the one or more oils is selected from the group consisting of a soybean oil, a palm oil, an olive oil, a corn oil, a canola oil, a linseed oil, a rapeseed oil, a castor oil, a coconut oil, a cottonseed oil, a palm kernel oil, a rice bran oil, a safflower oil, a sesame oil, a sunflower oil, a tall oil, a lard, a tallow, a fish oil, and a mixture thereof.

10. The method according to claim 7, wherein the step of copolymerizing the at least two substances is accomplished using ultraviolet radiation.

11. The method according to claim 7, wherein the pressure sensitive adhesive is selected from the group consisting of a removable pressure sensitive adhesive and a permanent pressure sensitive adhesive.

12. A method for forming a pressure sensitive adhesive, the method comprising:
   (a) providing a conjugated linoleic acid; and
   (b) copolymerizing the conjugated linoleic acid with an acrylic monomer using organic solvent-based polymerization or on web polymerization.

* * * * *